Patented June 10, 1947

2,422,153

UNITED STATES PATENT OFFICE 2,422,153

RUBBER BONDED ABRASIVES

Garret Van Nimwegen, Carl von Doenhoff, and Charles E. Wooddell, Niagara Falls, N. Y., assignors to The Carborundum Company, Niagara Falls, New York, N. Y., a corporation of Delaware No Drawing. Application July 7, 1943,
Serial No. 493,754

5 Claims. (Cl. 260—41)

This invention relates to articles formed mainly of or comprising rubber and/or synthetic rubber-like materials. It particularly relates to such articles where the rubber or rubber-like material serves as a bond or matrix for solid particles of inorganic or organic materials.

It is an object of the present invention to increase the strength of rubber and/or synthetic rubber-like materials and to improve articles made therefrom. A further object of the present invention is to provide means by which the strength of certain synthetic rubber-like materials may be sufficiently increased that they may be substituted for natural rubber. A specific object of our invention is to produce abrasive articles having bonds of cured rubber and/or synthetic rubber-like materials in which the strength and grinding characteristics are materially improved. Other objects of the present invention will be perceived from the description of the invention in the following specification.

Natural rubber as obtained from various vegetable sources is a somewhat heterogeneous mixture of rubber hydrocarbon, natural resins and proteins. Although the ratio of these constituents in natural rubber varies depending upon the source thereof and the methods of collecting, coagulating and purifying, the rubbers obtained are similar in that they contain large amounts of rubber hydrocarbon of the formula $(C_5H_8)_n$, $n$ indicating polymerization to an extent not precisely known.

For some time efforts have been made to synthesize rubber. While so far these attempts have not been successful, success has been obtained in producing synthetic materials which resemble natural rubber in that they have the ability to withstand stretching to at least twice their original length and to thereafter return to approximately their original length and in that they may be compounded, and in some cases vulcanized, in a manner similar to the methods employed with natural rubber. Such synthetic materials, which for convenience in reference we will, in the present case, call synthorubbers, do not have all properties identical with those of natural rubber. On the other hand with respect to certain uses such as those involving exposure to hydrocarbons, light and heat some of the synthorubbers exhibit properties greatly superior to those of natural rubber.

Included within the term synthorubbers are chloroprene polymers; polymers of butadiene, and/or its homologs and analogs; copolymers of butadiene, and/or its homologs and analogs with one or a plurality of: styrene, vinyl chloride, vinyl acetate, vinylidene chloride, olefines and acrylic and/or methacrylic acids and their derivatives, such as acrylonitrile and methyl methacrylate; plasticized polymerized vinyl chloride; and organic polysulphides such as those obtained by reacting sodium tetrasulphide with ethylene dichloride or dichloroethyl ether. The first three of the classes in the above list may further be described along with natural rubber, as "elastoprenes" (a term suggested by H. L. Fisher, A. S. T. M. Proc. (1941) 41, p. 529), and they are so called in the present application and the appended claims. With the exception of the chloroprene polymers, the most common commercial example of which is "neoprene," the synthetic elastoprenes which contain a substantial amount of a diolefine not only resemble natural rubber in their elastic properties but are also like natural rubber in being susceptible of vulcanization to a state like that of hard rubber or ebonite produced from natural rubber. By the term "ebonite vulcanizable elastoprene" as used in the present specification and claims is meant natural rubber or a synthetic rubber chosen from the polymers of butadiene, and/or its homologs and analogs; and copolymers of butadiene and/or its homologs and analogs with one or a plurality of: styrene, vinyl chloride, vinyl acetate, vinylidene chloride, olefines, and acrylic and/or methacrylic acids and their derivatives such as acrylonitrile and methyl methacrylate.

It is with the improvement of the strength and other characteristics of natural rubber and synthorubbers that the present invention is concerned.

In the copending application Serial No. 493,753, filed concurrently with the present application by Garret Van Nimwegen and Charles E. Wooddell, it has been disclosed that certain materials, when added to natural rubber or synthorubber mixes, materially increase the strength thereof. It has now been discovered that certain of these materials have another desirable property which can be taken advantage of in increasing the strength of rubber articles.

One of the most useful of these reactive materials or strength improvers and one which is found to produce very high strengths in cured articles is boric oxide ($B_2O_3$) which, for convenience, may be used in a partially hydrated form, such as tetraboric acid, though under properly regulated conditions not only can the anhydrous oxide be used but also the completely hydrated oxide ($H_3BO_3$). When the term boric oxide is used in the present specification and claims it is meant to include not only $B_2O_3$ but all hydrated forms thereof.

In some cases rubber or synthorubbers are compounded with fatty acids or in the case of certain types of synthorubbers are polymerized in the presence of a soap emulsion, the fatty acid of the soap being retained in the final synthorubber. The strength of rubber and synthorubber ebonites containing fatty acids prior to the present invention has been inferior and hence the fatty acid modified materials were not suitable for many uses in which high strength is important. This difficulty no longer obtains, however, since by the addition of the strength improvers of the present invention to ebonite vulcanizable elastoprene mixes containing fatty acid, it is possible to produce ebonite articles having a strength equal to or better than that of ebonite articles formed from natural rubber without a strength improver.

The gain in strength obtained by the use of a strength improver in a synthorubber mix which contained 6.3% of a fatty acid is illustrated by the following example:

*Example I*

|  | A | B | C |
|---|---|---|---|
|  | Parts by weight | Parts by weight | Parts by weight |
| "Hycar OS"[1] | 100 | 100 | 100 |
| Sulphur | 50 | 50 | 50 |
| Cryolite | 187 | 187 | 187 |
| Liquid Softener | 18.7 | 18.7 | 18.7 |
| Stearic Acid |  | 6.3 | 6.3 |
| Tetraboric Acid |  |  | 6.3 |
| Abrasive (fused alumina) | 880 | 880 | 880 |
| Tensile strength in p. s. i | 2,000 | 1,000 | 2,400 |

[1] Reported to be a copolymer of butadiene and styrene.

The mixes of this example were made on rolls and the specimens were cured 16 hours at 290° F. It will be seen from Example I that although the strength is considerably reduced by the fatty acid that it can be more than recovered by the addition of a moderate amount of strength improver. Similar results have been obtained with other amounts of fatty acids. By adding to the mix a sufficient amount of a strength improver under properly controlled conditions it is possible to obtain substantially the same strength in the presence of up to about 10% of fatty acid as would be obtained in the absence of fatty acid. In the mixes of Example I the total amount of non-reactive filler (cryolite and fused alumina abrasive) is in the proportion by volume to the amount of elastoprene of about 2.8:1.

In rubber mixes in which fatty acid is present and considerable amounts of abrasive grain or other coarse filler are used the fatty acid in addition to reducing the tensile strength also has the effect of causing the mix to become spongy and very difficult to work on the rolls. It has been discovered that the workability of such mixes can be materially improved by the addition of a coumarone-indene resin, such, for example, as that sold under the name Cumar V 2½, though other resins of the same type are suitable. The amount of resin necessary will vary considerably, depending upon the amount of fatty acid present, the amount of abrasive or filler and the particle size of the abrasive or filler. In general, a resin content of from about 5 to 60% (based on weight of rubber) will be sufficient for a fatty-acid content of from about 1 to 10%. The effect of coumarone-indene resin on the strength of rubber mixes containing fatty acids varies with the conditions of cure. In some cases, as a result of what appears to be better cohesion of the mix, the tensile strength may be improved. Furthermore, by the addition of a strength improver to the mix the tensile strength may be considerably improved in all cases.

Another way in which strength improvers have been found valuable is in connection with decomposed rubber. Decomposed rubber is produced by the thermal decomposition of unvulcanized rubber or soft vulcanized rubber and is a rather sticky fluid material. It is used where a liquid rubber composition is desired, being employed as a holding medium for bristles in brushes and in making abrasive articles where it is desired to use a distributable mix rather than a sheeted material. The following example illustrates the improved strength and stiffening effect obtained in a decomposed rubber mix by use of a strength improver.

*Example II*

|  | A | B |
|---|---|---|
|  | Parts by weight | Parts by weight |
| Decomposed Rubber | 100 | 100 |
| Sulphur | 50 | 50 |
| Zinc Oxide | 1.6 | 1.6 |
| Accelerator | 3.2 | 3.2 |
| Cryolite | 90.3 |  |
| Tetraboric Acid |  | 54 |
| Phenol-formaldehyde liquid resin | 1.1 | 1.1 |
| Abrasive (fused alumina) | 1,250 | 1,250 |
| Tensile Strength (p. s. i.)—1,000 p. s. i. molding pressure. | 2,800 | 3,200 |
| Tensile Strength (p. s. i.)—2,000 p. s. i. molding pressure. |  | 4,000 |
| Tensile Strength (p. s. i.)—4,000 p. s. i. molding pressure. |  | 4,700 |

The above mixes (approximately equal volumes of cryolite filler and tetraboric acid being used) were made by combining the ingredients in a mixer, the granular mix then being placed in a mold and pressed at the pressures specified. Curing was in the mold on a hot press at temperatures up to 330° F. The most important result of the use of a strength improver such as tetraboric acid with decomposed rubber compositions, though the added strength at low pressures is considerable and desirable, is the stiffening of the mix by the strength improver during the early heating so that greater pressures can be used than could be otherwise employed and hence not only can denser articels be obtained but higher filler loading is possible. As will be noted from Example II, the strength obtained in the mix containing tetraboric acid and pressed at 4000 p. s. i. was almost 50% above that of the same mix pressed at 1000 p. s. i. Any attempt, however, to increase above 1000 p. s. i. the pressure on the mix containing no tetraboric acid resulted in the extrusion of the decomposed rubber from the mold.

An effect somewhat analogous to the action of strength improvers with decomposed rubber is to be found in their action with natural rubber containing no sulphur. It has been found that when a small amount of tetraboric acid is mixed with natural rubber and formed into a shape and the shape is placed in an oven at 300° F. for a few hours, the rubber undergoes a stiffening similar to and almost as complete as if it were fully vulcanized with sulphur to the soft rubber stage. This is an entirely unexpected result since the rubber without any strength improver would have gradually softened and disintegrated to a sticky liquid under the heat treatment. While the reason for this action is not completely understood, it is believed that there occurs an oxygen vulcanization analagous to sulphur vulcanization which may be catalyzed by the strength improvers.

It is frequently desirable when working with rubber to use softening agents. Among those which have been used are dibutyl phthalate, light pine tar, pine oil, and dibenzyl ether. Such softeners improve the workability of a rubber mix.

As previously pointed out, the copending application, Serial No. 493,753, discloses the use of certain agents, specifically boric oxide, vanadium oxide, and boroaluminate, for improving the strength of rubber and synthorubber mixes. In addition to the materials disclosed therein, it has been found that a number of other reactive materials may be used as strength improvers for rubber compositions and mixes. Among such materials are borates, phosphates, sulphates, nitrates, and halides, both organic and inorganic, which on hydrolysis exhibit strongly acid properties, organic acids exhibiting more strongly acid properties than phthalic acid, and esters of such acids. Among the specific compounds which are useful as strength improvers in accordance with the present invention are: boric oxide, orthoboric acid, tetraboric acid, zinc perborate, ethyl borate, pyrophosphoric acid, aluminum phosphate, ethyl phosphate, ammonium sulphate, zinc sulphate, ammonium persulphate, chromium sulphate, magnesium sulphate, ethyl sulphate, potassium aluminum sulphate, magnesium nitrate, 1-chloro-1-nitro-propane, calcium chloride, ammonium chloride, ferric chloride, phenylenediamine hydrochloride, chlorinated rubber, aluminum fluoride, ammonium oxalate, oxalic acid, maleic acid. It will be understood that this list is only illustrative and not exhaustive.

The precise reason why the above enumerated strength improvers and other compounds falling within the general classifications previously given produce an increased tensile strength and improvement in the properties of rubber and synthorubbers is not known. It is believed, however, that acidity is the controlling factor. Consequently, as the desirable results stem from the ability of the strength improver used to give, under the conditions of cure, a definitely acid condition, only substances of fairly strong acid characteristics appear to be effective. In this connection it has been found that while acidity, or more strictly an acid reacting material, in the mix results in a retardation of cure, the retardation is to a very large extent a function of the moisture content of the mix.

It follows that control of the amount of available moisture in the mix is very important. Some moisture is, of course, necessary to produce hydrogen ionization at curing temperature, but too much moisture is undesirable since it both retards the cure and it may result, like too little moisture, in preventing the attainment of the maximum strength possible. It has been found that even when the acid reacting strength improvers of the present invention are utilized it is possible to prevent undue retardation of cure by controlling the moisture content of the mix, and in some cases with an optimum amount of moisture for the purpose of increasing the strength, the retardation of cure is negligible. It will be realized that the normal materials of a rubber mix are as ordinarily used not completely anhydrous and that in addition to the mechanically held or chemically combined water of any strength improver used the moisture present in the other ingredients of the rubber mix must be taken into account in calculating the total available moisture in mixes at curing temperature.

While the theory advanced above is believed to account for the phenomena which result from the present invention it is not intended that this explanation shall be binding and it will be understood that whatever the reason for the improvement in rubber bonded articles by the use of the strength improvers of the present invention it is not intended to disclaim by this explanation any of the said invention.

In using these strength improvers they may be added to the rubber of synthorubber mix on the rolls or in a mixer or in any other desired way. For example, they may be added to latex or to an artificial latex-like dispersion of natural or synthorubber prior to coagulation. Indeed in some cases these materials may serve as coagulating agents which need not be washed from the precipitate. Where the synthorubber serves as a bond or matrix for particles of another material, such as abrasive grain for example, strength improving material may be coated on the particles which then may be dipped in or mixed with latex or synthorubber dispersions to cause the coagulation of rubber or synthorubber around the coated particles. Satisfactory results may also be obtained by coating solid particles such as abrasive grain with the strength improving material utilizing for the purpose an adhesive of suitable character, not incompatible with the rubber or synthorubber to be used and adding such coated grain to the rubber or synthorubber mix.

The amount of the strength improvers which can be used will of course vary with the particular material. In general there is no upper limit to the permissible amount except that imposed by the increased difficulty of working the mix. Exceptions to this, for reasons previously pointed out, are those strength improvers which contain water, either combined or as moisture. With some strength improvers a noticeable increase in strength can be found when using no more than 1 part per thousand by weight (based on the rubber) though the preferred amount is usually in the neighborhood of 5 to 15 parts per hundred. Of course where a fatty-acid-containing rubber mix is used the amount of strength improver may have to be increased over these amounts if high strength is to be obtained with the composition.

The increased strength imparted to a synthorubber composition by a number of the strength improvers above cited is shown by the following example:

*Example III*

| | A | B | C | D | E | F | G |
|---|---|---|---|---|---|---|---|
| | Parts by weight | Parts by weight | Parts by weight | Parts by weight | Parts by weight | Parts by weight | Parts by weight |
| "Hycar OR" [1] | 100 | 100 | 100 | 100 | 100 | 100 | 100 |
| Sulphur | 40 | 40 | 40 | 40 | 40 | 40 | 40 |
| Liquid Softener | 25 | 25 | 25 | 25 | 25 | 25 | 25 |
| Cryolite Filler | 300 | 300 | 300 | 300 | 300 | 300 | 300 |
| Strength Improver | | [2] 8 | [3] 8 | [4] 8 | [5] 8 | [6] 8 | [7] 8 |
| Tensile strength (p. s. i.) | 2,700 | 4,000 | 3,700 | 3,600 | 3,400 | 3,750 | 3,900 |

[1] Reported to be a copolymer of butadiene and acrylonitrile.
[2] CaCl$_2$.  [3] ZnSO$_4$.  [4] Mg(NO$_3$)$_2$.  [5] H$_4$P$_2$O$_7$.  [6] (NH$_4$)$_2$C$_2$O$_4$.  [7] NH$_4$Cl.

The mixes of Example III were made by combining the ingredients on rolls and the specimens were cured at approximately 300° F. for 18 hours. It will be noted that, although all of the mixes of Example III containing strength improvers have tensile strengths greatly in excess of the strength of the blank of Example III-A, as between the strength improvers illustrated, these tensile strength figures do not conclusively show their relative value since, as may be noted, they were all used in the same amount (which was not necessarily the optimum for any one) and the moisture content of the mixes was not controlled to give the optimum strengthening effect. The mixes in Example III contain nonreactive cryolite filler in the approximate proportion by volume to the synthetic rubber of 1:1.

The present invention is particularly useful in making articles, such as, for example, abrasive articles or brake linings where a comparatively small amount of a rubber or synthorubber composition is used as a bond for large amounts of particulate material or filler, granular fibrous or otherwise. The small amount of rubber composition usually used in proportion to the amount of bonded material results in an inherent weakness in such articles. Hence the use of the strength improvers of the present invention is extremely desirable since the tensile strength of such articles can be consistently raised to an extent seldom if ever before attained.

In the following example the use of a number of different strength improvers with a synthorubber abrasive mix is illustrated.

lower temperature. An example of this was found in the discovery that the strength of identical rubber-abrasive mixes, one cured at 330° and the other at 290° showed a difference in tensile strength of almost 50% in favor of the mix cured at the lower temperature. The use of low temperatures is particularly important during the early stages of curing. The importance diminishes as the cure advances.

Insofar as the use of strength improvers with abrasive mixes is concerned, it is not intended that the invention shall be limited to any particular abrasive such as fused alumina as all common abrasives including silicon carbide, emery, boron carbide, diamonds, etc., may be used. Moreover, abrasive articles of various shapes and types may be produced.

It should also be understood that the rubber mixes disclosed in the specific examples herein may be varied as necessary to produce articles having the properties and characteristics desired. It is well known that the hardness or stiffness of rubber compositions must be varied for different uses. Properties necessary in a rubber composition for making a tire are different from those required in making an abrasive wheel. Indeed, two different rubber bonded abrasive wheels used for grinding different materials may require a difference in the rubber bond characteristics and different characteristics may be necessary in the tire between the rubber of the tread and the rubber of the sidewalls. Accordingly, the proportions of rubber and other compounding ingredients may be changed in any

*Example IV*

|  | A | B | C | D | E |
|---|---|---|---|---|---|
|  | Parts by weight | Parts by weight | Parts by weight | Parts by weight | Parts by weight |
| "Hycar OR"[1] | 100 | 100 | 100 | 100 | 100 |
| Sulphur | 40 | 40 | 40 | 40 | 40 |
| Liquid Softener | 25 | 25 | 25 | 25 | 25 |
| Cryolite Filler | 300 | 300 | 300 | 300 | 300 |
| Calcium Chloride |  | 5 |  |  |  |
| Chlorinated Rubber |  |  | 5 |  |  |
| Aluminum Phosphate |  |  |  | 5 |  |
| Ethyl Sulphate |  |  |  |  | 5 |
| Abrasive (fused alumina) | 1,230 | 1,230 | 1,230 | 1,230 | 1,230 |
| Tensile Strength in p. s. i | 1,000 | 2,300 | 1,900 | 1,300 | 2,100 |

[1] Reported to be a copolymer of butadiene with acrylonitrile.

The above mixes were made by combining the materials on rolls and the specimens were cured at about 300° F. for 18 hours. It should be noted here, as in Example III that the value of the various strength improvers mentioned cannot be determined solely on the basis of the tensile strengths shown since they are used in the same amounts rather than in the optimum amounts. The mixes of Example IV contain non-reactive filler, including abrasive, in a proportion by volume to the synthetic rubber of about 4.1:1.

Another factor which has been found to influence the strength of rubber compositions is the temperature used during curing. It has been found to be desirable, if the full benefit of the present invention is to be obtained, to maintain the curing temperature as low as possible with due regard, of course, to the avoidance of the necessity of an unduly prolonged time for completing the curing. A practical and desirable range of temperatures which produces good results is from 275° to 300° F. The use of a temperature much over 300° F. is quite likely to result in some reduction in strength over that obtainable at a manner necessary. Where it is desirable, nonreactive fillers such, for example, as whiting, clay, iron oxide, chromium oxide, hard rubber dust, cryolite, etc. may be used. Other compounding ingredients such as accelerators, anti-oxidants, softeners and the like may also be used as desired or required. It is, however, desirable to use compounding ingredients which are not strongly alkaline as it has been found that the inclusion of such ingredients in the mix reduces or destroys the effectiveness of the strength improver. Of course, the proportion and size of the abrasive grain in the abrasive containing mixes may also be varied as required and substitutions of fillers made if desired. While in most of the examples given the mix has been compounded on rolls, it will be understood that any other desired or convenient way of mixing may be used without interfering with the action of the strength improver.

Another property of the materials disclosed herein as strength improvers for rubber compositions which may be advantageously employed is the tendency of rubber compositions either solid or liquid, as cements, to exhibit greater adhesion to surfaces when small amounts of these materials are present in the composition. This is of great importance in the making of articles in which an intermediate resilient layer of rubber is used. Another phenomenon which is of considerable value is the fact that the adhesion of rubber compositions to surfaces may be increased 200% or more over the normal by applying a solution of boric acid ($H_3BO_3$) to the contacting surfaces prior to assembling.

The term "filler" as used in the specification and claims is meant to include abrasive grain as well as those materials ordinarily regarded as fillers unless a contrary intention is shown.

Comprehended within the present invention is the improvement of all types of rubber and synthorubber mixes by the use of the materials disclosed herein. Natural rubber and synthorubbers may be used in various mixtures and the desirable results of the invention may still be obtained.

Having now described the invention, it is intended that it shall be construed broadly with full regard to known equivalents and variations which do not depart therefrom and that it shall be limited only by the scope of the appended claims.

We claim:

1. An ebonite cured composition comprising the reaction product of a copolymer of butadiene and styrene, sulfur in sufficient amount to vulcanize said copolymer to the ebonite state, a fatty acid, boric oxide in an amount from 0.1 to 15% by weight of said copolymer, and a non-reactive filler in a proportion by volume with respect to said copolymer of from 1:1 to 4.1:1.

2. An ebonite cured composition comprising the reaction product of a copolymer of butadiene and styrene, sulfur in sufficient amount to vulcanize said copolymer to the ebonite state, a fatty acid, boric oxide in an amount from 0.1 to 15% by weight of said copolymer, and a non-reactive filler in a proportion by volume with respect to said copolymer of from 1:1 to 4.1:1, said filler being at least in major part a granular abrasive.

3. An ebonite cured composition comprising the reaction product of a copolymer of butadiene and styrene, an amount of sulfur sufficient to vulcanize said copolymer to the ebonite state, a fatty acid, coumarone-indene resin, boric oxide in an amount from 0.1 to 15% by weight of said copolymer, and a non-reactive filler in a proportion by volume of from 1:1 to 4.1:1 with respect to said copolymer.

4. An ebonite cured composition comprising the reaction product of a copolymer of butadiene and styrene, an amount of sulfur sufficient to vulcanize said copolymer to the ebonite state, a fatty acid, coumarone-indene resin, boric oxide in an amount from 0.1 to 15% by weight of said copolymer, and a non-reactive filler in a proportion by volume of from 1:1 to 4.1:1 with respect to said copolymer, said filler being at least in major part a granular abrasive.

5. The process of producing improved strength in ebonite cured compositions which comprises adding boric oxide in an amount from 0.1 to 15% by weight of said copolymer to a mix of: a copolymer of butadiene and styrene, sufficient sulfur to cure said copolymer to the ebonite state, and a non-reactive filler, said filler being present in a proportion by volume of from 1:1 to 4.1:1 with respect to said copolymer, while working the mixture, and thereafter curing the mix at not substantially above 300° F.

GARRET VAN NIMWEGEN.
CARL von DOENHOFF.
CHARLES E. WOODDELL.

REFERENCES CITED

The following references are of record in the file of this patent:

UNITED STATES PATENTS

| Number | Name | Date |
|---|---|---|
| 21,572 | Ott | Sept. 17, 1940 |
| 1,248,226 | Wells | Nov. 27, 1917 |
| 1,912,448 | Harkins | June 6, 1933 |
| 1,913,244 | Reimann | June 6, 1933 |
| 2,190,776 | Ellingboe et al. | Feb. 20, 1940 |